Sept. 16, 1969     M. R. ESTABROOK     3,466,809
MACHINE TOOL TRAVERSE CONTROL
Filed June 7, 1967     3 Sheets-Sheet 1
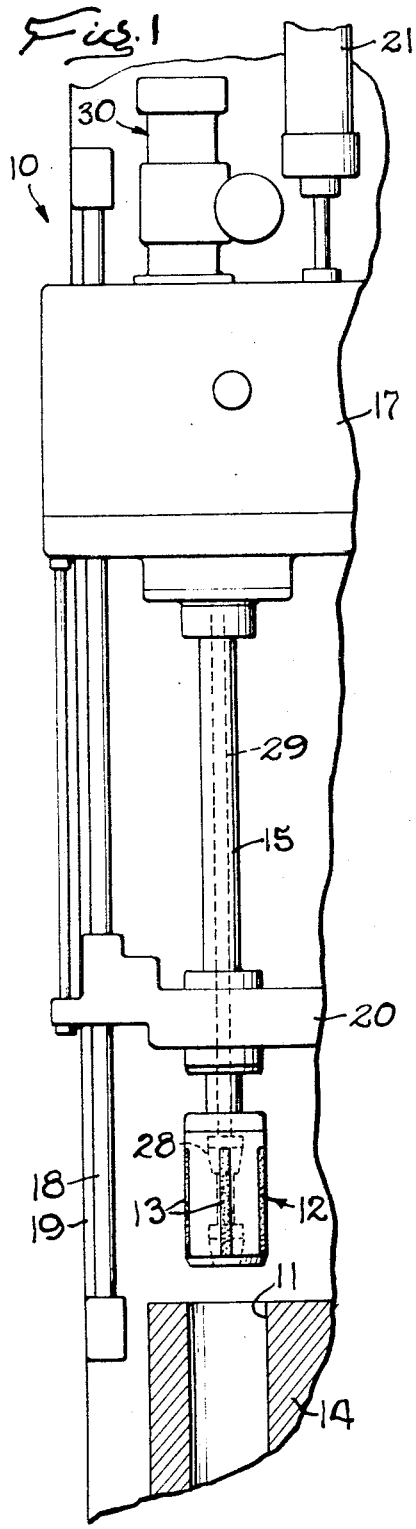
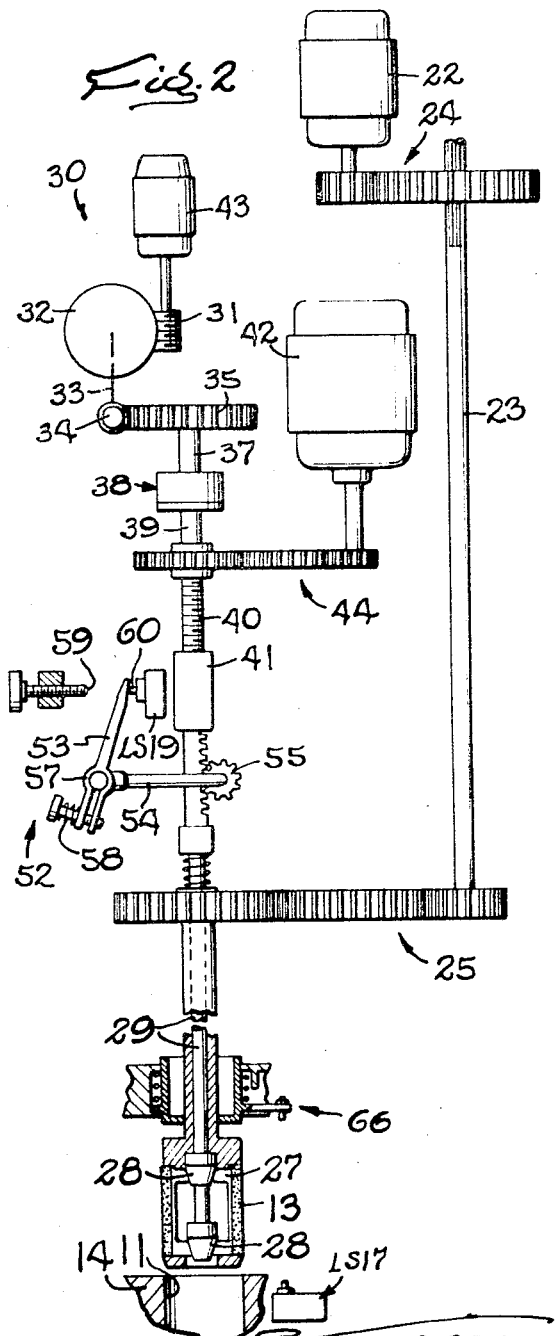
INVENTOR
Mark R. Estabrook
ATTORNEY

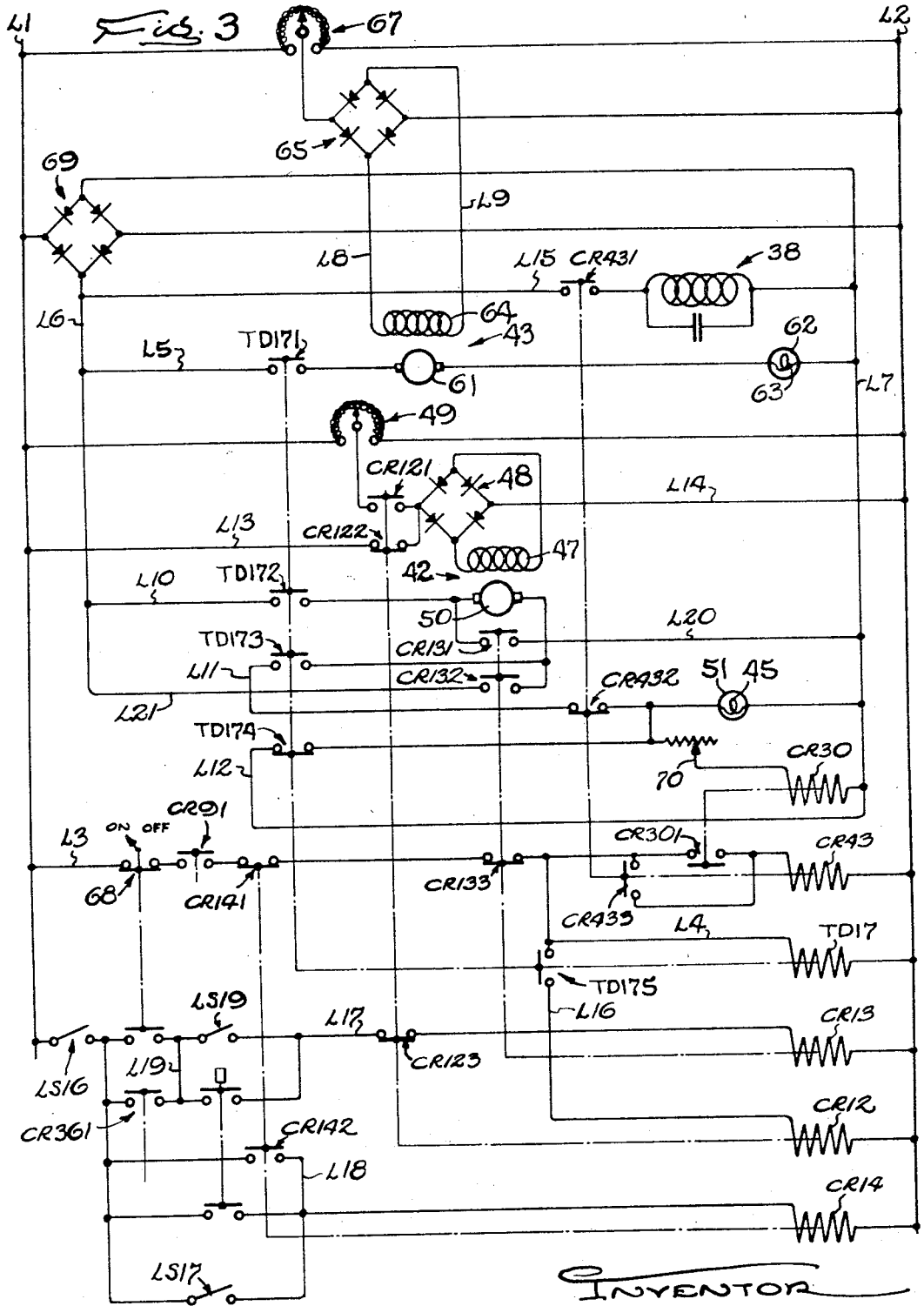

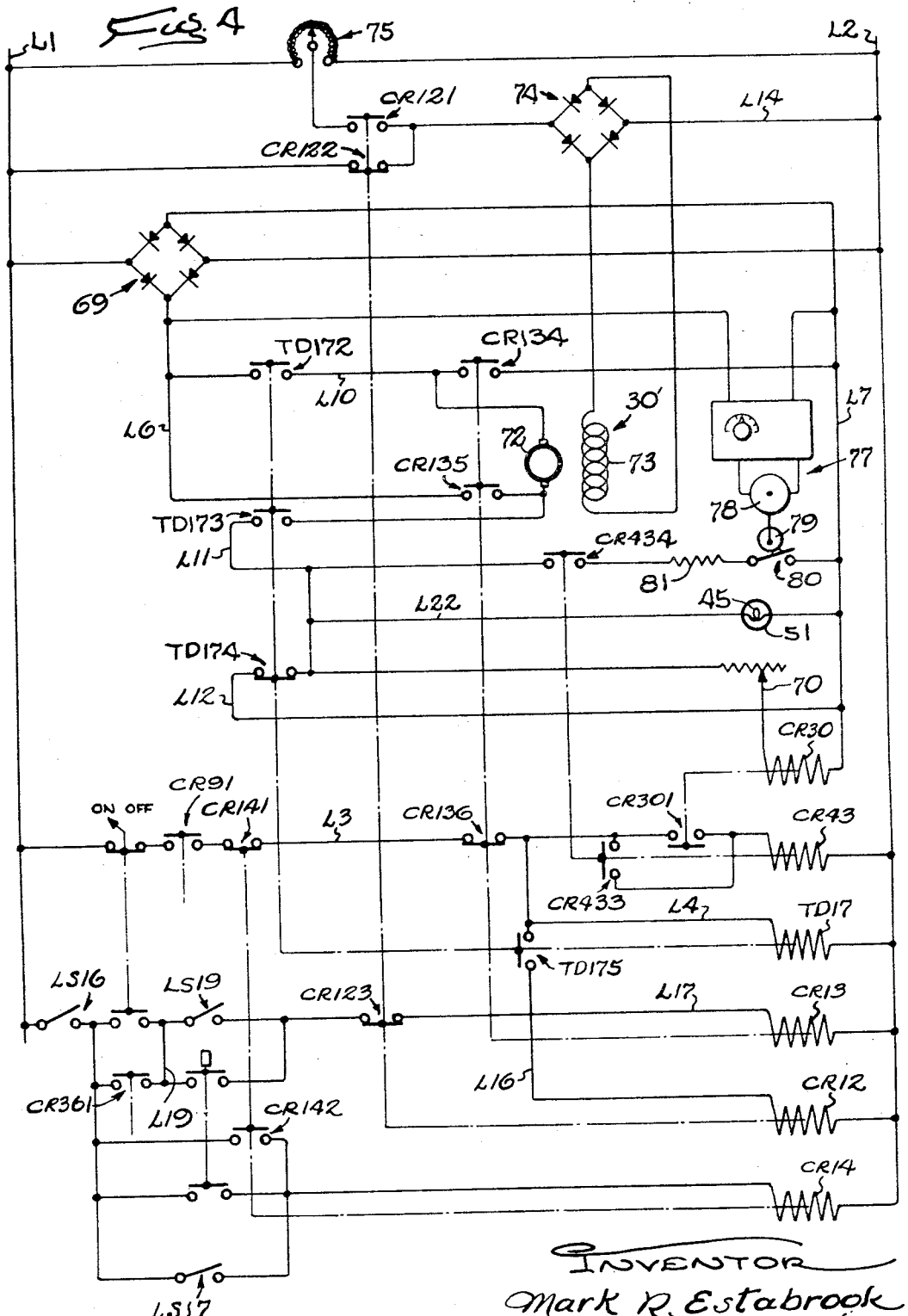

United States Patent Office 3,466,809
Patented Sept. 16, 1969

3,466,809
MACHINE TOOL TRAVERSE CONTROL
Mark R. Estabrook, Rockford, Ill., assignor to Barnes Drill Co., Rockford, Ill., a corporation of Illinois
Filed June 7, 1967, Ser. No. 644,303
Int. Cl. B24b *33/02, 49/16, 51/00*
U.S. Cl. 51—165     14 Claims

ABSTRACT OF THE DISCLOSURE

An automatic honing machine including a rotating and reciprocating tool carrying a plurality of honing stones that are fed progressively outwardly within a work bore to expand the tool and hone the bore. With the tool collapsed, the stones are first fed outwardly at a relatively rapid rate by a weak electric motor having an armature connected in series with a lamp bulb with a tungsten filament having a high positive temperature coefficient such that the voltage drop across the resistor increases in relation to the current drawn by the armature. When the stones engage the bore wall, the motor stalls out and the resulting current increase is used as a signal to reduce the feed speed and increase feed torque for the honing operation, the changeover being accomplished either by shifting to a separate feed motor or modifying the effective operating characteristics of the first motor. To reduce the initial feed rate prior to engagement of the stones with the wall, a preliminary load is introduced into the expansion mechanism as the stones approach the wall.

BACKGROUND OF THE INVENTION

This invention relates to the feeding of machine tool elements, for example, the stones of an automatic honing machine, and more particularly to the initial feeding or traversing of the elements rapidly into contact with the work and the changeover to a slower feed rate used for the machining operation. In prior honing machines, rapid expansion has been terminated and slow expansion started by a variety of devices including mechanical torque-responsive slipping arrangements as shown in Patents Nos. 3,237,350 and 2,795,089, and wear-compensating switching mechanism as shown in Patent No. 2,819,566 for terminating the rapid feed when the stones are a preselected distance from the bore wall. With each type of mechanism, the goal is to feed the stones as rapidly as possible into engagement with the work while avoiding the application of excessive force that could damage the stones or the expansion mechanism.

SUMMARY OF THE INVENTION

The primary object of the present invention is to feed the stones rapidly all the way into engagement with the work before switching to slow feed, for optimum time saving at the beginning of the cycle, while controlling the maximum load applied to the stones prior to switching more reliably than has been possible with the torque-responsive mechanical slipping arrangements, and with simpler mechanical components. More specifically, the rapid feed is accomplished with a weak, variable speed and torque electric motor which feeds the stones at high speed into engagement with the work and stalls while exerting torque below the safe limit of the mechanism, and the stalling of the motor is sensed and signaled in a novel manner to initiate slow feeding at higher torque levels either with a second motor or by increasing the effective strength of the first motor. Other objects of the invention are sense and signal the stalling of the motor with a novel device that also modulates the motor torque to maintain the torque within safe limits; to begin reducing the speed of initial feed when the stones are close to the bore wall and thereby reduce the impact on engagement; and to control a single feed motor in a novel manner to produce both the high speed-low torque range of operation required for the initial rapid feeding and the lower speed-higher torque range of operation required for effective honing.

Other objects and advantages of the invention will become apparent from the following description, taken in conjunction with the accompanying drawings.

BRIEF DESCRIPTION OF THE DRAWINGS

FIGURE 1 is a fragmentary side elevational view of a honing machine incorporating the novel features of the present invention, the workpiece being shown in cross-section.

FIG. 2 is a fragmentary schematic view, partly in cross-section, showing the elements of the expansion mechanism of the machine in FIG. 1 in relation to the drive motors and the honing tool.

FIG. 3 is a wiring diagram showing the basic elements of a control for the two expansion motors of the honing machine in FIGS. 1 and 2.

FIG. 4 is a diagram similar to FIG. 3 but showing an alternate form of the control utilizing a single motor for both rapid and slow feeding.

DESCRIPTION OF THE FIRST EMBODIMENT

As shown in the drawings for purposes of illustration, the invention is incorporated in an automatic machine 10 (FIGS. 1 and 2) for honing bore walls 11 with one or more tools 12 each carrying a plurality of abrasive stones 13 that are fed progressively outwardly into the workpiece 14 as the tool is rotated and reciprocated within the bore. In this manner, the machine removes surface roughness on the bore wall while bringing the bore up to the desired size and providing the desired finish on the wall.

In this instance, the tool 12 is carried on an elongated hollow spindle 15 journaled on a head 17 (FIG. 1) slidable back and forth along vertical guide bars 18 supported on a column 19 constituting part of the machine frame, and the head and a spindle guide bracket 20 thereon are reciprocated in the usual manner by a suitable hydraulic actuator 21. Mounted above the head is an electric motor 22 coupled to the spindle 15 through a splined shaft 23 and gearing at 24 and 25 (FIG. 2) so as to rotate the spindle as the head is alternately raised and lowered along the guide bars, the workpiece 14 being suitably supported below the head in a conventional fixture (not shown).

The honing tool 12 is of a conventional type comprising a hollow, generally cylindrical body formed with a series of angularly spaced longitudinal slots in which abrasive stones 13 of generally rectangular cross-section are disposed with followers 27 on the inner sides of the stones engaging conical cams 28 on the lower end of an elongated rod 29 extending upwardly through the spindle 15 to the head 17, the cams and the rod constituting part of the expansion mechanism for feeding the stones outwardly relative to the tool body into engagement with, and progressively into, the bore wall 11 during the honing cycle. As the rod is moved downwardly, the stones are cammed and pushed radially outwardly at a rate determined by the rate of push rod movement and the slope of the cams, and are pressed against the bore wall with a force proportional to the force exerted on the push rod.

Movement of the push rod 29 during honing is effected by an electric actuator 30 through appropriate reduction gearing that may take various forms, herein a worm 31 driving a worm wheel 32 on an intermediate shaft 33 carrying a second worm 34 driving a worm wheel 35 on a shaft 37 connected by a selectively operable clutch 38 to a coaxial shaft 39 threaded at 40 into a nut 41 on the upper end of the push rod. Thus, rotation of the shaft 39 in one direction shifts the nut and the push rod downwardly through the spindle to expand the tool, and reverse rotation draws the push rod back up through the spindle to permit collapsing of the tool.

For rapid expansion and collapse of the tool 12 at the beginning and the end of the honing cycle, the actuator 30 rotates the drive shaft 39 at a much faster rate than the normal honing rate, thereby avoiding the time loss that would result if the normal honing rate were used. The two-speed or two-range actuator used for this purpose may take the form of two separate motors 42 and 43 (FIGS. 1–3) or a single motor 30' (FIG. 4) operated at different speeds during traversing and feeding. In the two-motor control, the traverse motor 42 is geared at 44 directly to the drive shaft and the feed motor 43 drives the worm 31 to turn the drive shaft only when the clutch 38 is engaged, the traverse motor then being deenergized and turning idly with the shaft. During traversing, the feed motor is deactivated by disengaging the clutch so as to eliminate the appreciable load that would be imposed by the motor through the worm reductions 31, 32 and 34, 35.

The present invention contemplates a novel manner of controlling the tool feeding mechanism electrically to advance the tool elements 13 rapidly into engagement with the bore wall 11 before switching to slow feed for the machining operation, while limiting the maximum applied load more reliably and simply than with prior controls serving the same general purpose. In this way, the time required for traversing is held to a minimum, damage to the tool elements and expansion mechanism is avoided, and the special mechanical slipping arrangements previously used are eliminated.

To these ends, the initial feeding or expansion is accomplished with a weak variable speed and torque electric actuator which feeds the stones at high speed from the initial collapsed condition into engagement with the workpiece 14 and stalls at a torque level below the safe limit, and stalling of the actuator is sensed and used to produce an electrical signal for initiating slow feeding at the higher torque levels required for honing. Moreover, the torque exerted during traversing is modulated by a positive temperature coefficient resistor 45 (FIGS. 3 and 4) which prevents an excessive torque rise upon stalling, and which also produces a voltage signal indicating the stalled condition and initiating slow feeding.

In the two-motor form shown in FIGS. 1–3, the traverse motor 42 is a D.C. torque motor on the order of ⅕ horsepower, and the feed motor 43 is a D.C. torque motor on the order of ⅟₅₀ horsepower. The higher gear ratio of the smaller feed motor, however, produces the higher torque used for honing. As will be seen in FIG. 3, the field winding 47 of the traverse motor is energized through a rectifier 48 the input of which is controlled by a variable transformer 49 for selecting a particular field strength for the motor below the full strength obtained with full source voltage. The armature 50 of the traverse motor is wired in series with the positive temperature coefficient resistor 45 which herein is simply the tungsten filament of an incandescent lamp bulb 51. Accordingly, the current drawn by the traverse motor armature also flows through the lamp filament. While only one bulb is shown in the drawing, a series of bulbs may be connected in parallel. For example, two 150 watt-rated bulbs may be used.

The resistance value of positive temperature coefficient resistors increases with the temperature of the resistor, and lamp bulb filaments have a high coefficient and a temperature that increases generally in accordance with the well known relationship $W=I^2R$, where W is the rate of heat dissipation in watts, I is the current in amperes, and R is the resistance in ohms. Since the heat increases with the square of the current through the resistor, the filament resistance increases sharply with the current. Moreover, the current drawn by the motor armature 50 under no-load conditions—that is, when the stones 13 are spaced from the workpiece 14 and the only load on the motor is the internal resistance of the drive mechanism— is relatively low but increases as the load builds up and tends to slow down the motor. This is because the current drawn is determined by the difference between the terminal voltage of the armature and the back voltage generated by the armature, and back voltage is highest when the armature is running at top speed, falling off as the speed is reduced.

Applying the foregoing explanation of general principles to the traverse motor control, it will be seen that this motor runs at virtually no-load speed, drawing current at a low rate, before the stones 13 engage the wall 11, but its speed drops to zero or stalled condition upon engagement. This drop in speed causes the armature current to increase materially so that the lamp filament 45 is heated almost instantly to a higher temperature that raises the filament resistance to a higher level. When the resistance rises, the voltage drop across the filament increases according to the well-known relationship $E=IR$, where E is the voltage, I is the current in amperes, and R is the resistance in ohms. This increased voltage, in turn, is used to switch to the lower speed/higher torque drive for the honing operation.

It also is well known that the torque exerted by such a motor is proportional to the current drawn, so the torque tends to increase as the traverse motor slows toward the stalled condition, normally reaching its maximum value when at zero speed. The increasing voltage drop across the resistor 45, however, not only produces the switching signal but also modulates the torque increase by reducing the terminal voltage by the amount of the increase in the voltage drop across the resistor. Accordingly, the resistor prevents the motor torque from rising to an excessive level that could damage the stones.

To reduce the traverse motor speed below its no-load speed before engagement of the stones 13 with the wall 11, and thereby reduce the shock resulting upon engagement, an outside resistance to tool expansion is introduced into the expansion mechanism and made effective when the stones are close to the bore wall. In this instance, this resistance is provided by a device 52 (FIG. 2) similar to the stonewear compensators used in some conventional expansion mechanisms (see Patent No. 2,819,566) to stop the traverse motor and start the feed motor before the stones reach the wall.

As shown in FIG. 2, the loading device 52 includes an arm 53 frictionally mounted on a shaft 54 that is turned back and forth about its longitudinal axis as the push rod nut 41 moves up and down, the movement being transmitted to the shaft through a pinion 55 meshing with a rack shown schematically as connecting the nut to the push rod 29. The hub 57 of the arm is split and clamped around the shaft by a coiled compression spring 58 which exerts a preselected frictional clamping force on the shaft. The free end portion of the loading arm is positioned to swing back and forth along a predetermined path or arc between an adjustable stop 59 and the operator 60 of a switch LS19, and normally turns counterclockwise (FIG. 2) with the shaft during traversing. Upon engaging the stop 59, however, the arm slips relative to the shaft and thereafter exerts a drag on the shaft that is determined by the force of the spring 58, the drag continuing until the traverse motor 42 stalls. As will be seen in the above patent, the loading arm may be set to engage the stop when the stones are a preselected distance from the bore wall each time the tool 12 is expanded, and therefore provides the selected drag near the end of each rapid-traverse operation, the amount of free expansion being the same during each cycle.

The drag exerted during slipping is sufficient to slow down the traverse motor 42 near the end of its operation by as much as fifty percent, thereby greatly reducing the force of impact with which the stones 13 engage the wall 11. While the stonewear compensator is a very convenient way to apply a loading force as the stones approach the wall, it will be evident to those skilled in the art that the force may be applied in other ways with comparable results.

The feed motor 43 of the two-motor form has an armature 61 (FIG. 3) that also is connected in series with a lamp bulb 62 with a filament 63 for modulating the feed rate and the torque exerted in response to the load experienced, this being the subject matter of pending application Ser. No. 443,875, filed Mar. 30, 1965, now Patent No. 3,410,028, dated Nov. 12, 1968. The field winding 64 of this motor is energized by a rectifier 65 having an input terminal connected to a variable transformer 67 for selecting the force range of the feed motor. To energize this motor in response to the rise in the voltage drop across the first lamp bulb 51, a voltage-responsive relay CR30 is connected across the lamp bulb to be actuated when the lamp voltage attains a preselected level, and this relay has a switch CR301 for engaging the feed clutch 38 to activate the feed motor while deenergizing the traverse motor 42, as will be explained in detail in the following description of the honing cycle.

DESCRIPTION OF CONTROL CIRCUITS AND SUMMARY OF OPERATION, FIGS. 1–3

The operation of the expansion mechanism during a typical honing cycle will be more easily understood from the partial schematic wiring diagram in FIG. 3 in which the various components are shown in their initial condition with all control relays deenergized. With the honing tool 12 collapsed, the spindle motor 22 running, and the head 17 reciprocating up and down along the guide bars 18, tool expansion is initiated by pressing a start button (not shown) and thereby causing the closing of switch CR91 in a line L3 connected across two 110 volt A.C. power lines L1 and L2, thereby completing a circuit through an on-off switch 68, closed switches CR141 and CR133, and a line L4, through the coil of a timer TD17. The timer is of a well-known type having three switches TD171–3 which close immediately when the timer coil is energized, and two timed switches TD174 and TD175 operated after a preselected time delay such as .5 of a second to one second. Herein, one timed switch TD174 opens after the delay and another timed switch TD175 closes.

Closing of switch TD171 immediately completes a circuit through line L5 and the feed motor armature across two D.C. lines L6 and L7 connected across the output terminals of a rectifier 69 having input terminals connected across the power lines L1 and L2. This starts the feed motor 43, the field winding 64 being energized through the rectifier 65 and lines L8 and L9. Switches TD172 and TD173 start the traverse motor 42 by completing "forward" circuits for the armature 50 through lines L10, L11 and L12 (across D.C. lines L6 and L7), and for the field winding 47 through line L13, switch CR122, the rectifier 48, and line L14. It will be noted that the feed clutch 38 is deenergized because switch CR431 is open in line L15, and that the traverse motor field winding is energized initially with full voltage (by-passing transformer 49) to insure that the motor is strong enough to overcome the inertia and internal friction of the system to start feeding the stones 13. The lamp bulb 45 is shorted and by-passed through line L12, and this also prevents false signaling by the bulb as the result of an initial current surge.

After the selected delay sufficient to insure that tool expansion has started, timed switch TD174 opens in line L12 to activate the lamp bulb 45 for sensing increases in armature current and controlling the traverse motor's torque. At the same time, switch TD175 closes in a line L16 to energize relay CR12 which closes its switch CR121 and opens switch CR122 to activate the variable transformer 49 and thus reduce the field voltage of the traverse motor 42 from full value to the selected lower value for traverse feeding of the stones 13, for example, 20 volts. Switch CR123 also opens in a line L17 to prevent energization of a relay CR13 at this time. Accordingly, the traverse motor now runs at its rapid rate to drive the push rod 29 downwardly through the spindle 15 and cam the stones 13 rapidly outwardly relative to the tool body.

As the push rod 29 begins to move, the shaft 54 carrying the loading arm 53 begins to turn the arm counterclockwise (FIG. 2) away from switch LS19 which then closes idly in line L17. After the loading arm engages the stop 59, indicating that the stones 13 are close to the bore wall 11, continued rotation of the shaft 54 is resisted by the spring-applied frictional drag on the shaft, and this imposes an additional load on the traverse motor 42 to begin decelerating the motor before the stones reach the wall. This deceleration results in increased armature current which heats the filament 45 to a higher temperature to increase the resistance value and correspondingly reduce the terminal voltage of the armature while the loading arm slips on the shaft during the final interval of traverse expansion.

When the stones 13 engage the bore wall 11, further expansion is impossible and the speed of the traverse motor 42 immediately drops to zero. Accordingly, the armature current rises sharply, with a corresponding increase in the torque exerted by the motor. This current, however, heats the lamp filament 45 to increase its temperature and resistance and, therefore, the voltage drop in the armature circuit (lines L10 and L11) to reduce the terminal voltage of the armature and maintain the torque increase within safe limits.

Connected in parallel with the lamp bulb 51 is the voltage-responsive relay CR30 which has an adjustable slider 70 for picking off a selected portion of the voltage signal across the bulb. The slider is set to impose sufficient voltage across the relay's coil to actuate the relay when the lamp bulb voltage attains a level indicating that the traverse motor has stalled. When thus actuated, relay CR30 closes its switch CR301 in line L3 to energize a relay CR43 through now closed switches 68, CR91, CR141, and CR133, and relay CR43 closes its switch CR433 for a holding circuit around switch CR301, closes switch CR431 to energize the feed clutch 38, and opens switch CR432 in line L11 to deenergize the traverse motor armature 50. This stops the traverse motor 42 and simultaneously activates the feed motor 43 to initiate slow expansion of the tool 12.

After the changeover is accomplished, the honing operation is performed in the manner described in the aforesaid application. The stones 13 first removed surface roughness from the bore wall 11 and finally enlarged the bore to the desired size, whereupon a conventional sizing device 66 (FIG. 2) signals the completion of the operation by closing switch LS17 (FIGS. 2 and 3) to energize relay CR14. This relay closes its switch CR142 to complete a holding circuit in line L18 around switch LS17, and opens switch CR141 in line L3 to deenergize relays CR43 and CR12 and the timer TD17. This causes switch CR431 to open in the feed clutch circuit and switch CR432 to close idly in the circuit of the lamp bulb 51, while timer switch TD171 opens in the circiut of the feed motor armature 61, switches TD 172 and 173 open in the forward circuit of the traverse motor's armature 50, switch TD174 closes in by-pass line L12, and switch TD175 opens in the circuit of relay CR12.

Deenergization of relay CR12 causes its switch CR121 to open in the circuit of the traverse transformer 49, switch CR122 to close in the full-voltage circuit of the field winding 47, and switch CR123 to close in line L17 through which relay CR13 is to be energized. Switch LS16 at the left end of line L17 is closed whenever the tool 12 is at least partially expanded, and switch LS19 is closed when the loading arm 53 is spaced from the switch. Switch CR361, however, is controlled in a well-known manner to close only during each "up" stroke of the tool and to open during each "down" stroke. Thus, during the next upward movement of the tool after the size signal (switch LS17) is produced, switch CR361 closes to complete an energizing circuit for relay CR13 through line L17, switches CR123 and LS19, branch line L19, and switches CR361 and LS16.

When energized, relay CR13 closes its switches CR 131 and CR132 in the "reverse" circuit of the traverse motor armature 50 formed by lines L20 and L21 connected across the D.C. lines L6 and L7, around the lamp bulb 51. This applies full line voltage to the armature, full voltage also being applied to the field winding 47, so the motor 42 runs reversely to collapse the tool rapidly. The loading arm 53 swings clockwise (FIG. 2) back toward switch LS19 and opens the latter in line L17 to deenergize relay CR13 and stop the collapsing when the stones 13 are in a partially collapsed condition. This is accomplished when relay CR13 opens its switches CR131 and CR132 in the armature circuit. At the same time, switch CR133 is returned to its closed position in preparation for the next cycle, which is initiated by again closing the start switch and switch CR91 to energize relay CR43. Of course, appropriate controls are provided to operate the spindle-rotating and head-reciprocating actuators 22 and 21 in conjunction with the expansion mechanism, and the control includes the other usual components such as a manual reset switch 71.

DESCRIPTION OF CONTROL CIRCUITS AND SUMMARY OF OPERATION, FIG. 4

The alternate control shown in FIG. 4 is similar in many respects to the control in FIG. 3, and the same reference numbers are used to indicate many of the same or similar elements. The primary difference is the substitution of a single D.C. motor 30' for the two motors 42 and 43 in FIGS. 1–3 and the operation of this motor first as a weak traverse motor for rapid feeding, and then as a stronger feed motor for the slower feed range used during honing.

As before, expansion is initiated by closing a start switch (not shown) which closes switch CR91 in line L3 and energizes the timer TD17 through line L4 to close switches TD172 and TD173 immediately in lines L10 and L11 connected across D.C. lines L6 and L7, the armature 72 of the motor 30' being energized through a circuit including line L10, line L11 and another line L12 by-passing line L22 containing the lamp bulb 51. The field winding 73 of the motor is energized through a rectifier 74 having input terminals connected to the line L14 for energization through a variable transformer 75, in the same manner as the field winding 47 of the traverse motor 42 in FIG. 3. Switch CR122 initially is closed, so the motor starts with full field voltage and with the lamp bulb (or bulbs) 51 by-passed or short-circuited for full starting strength.

After the selected short delay, timed switch TD174 opens in by-pass line L12 to activate the bulb 51, and timed switch TD175 closes in line L16 to energize relay CR12. This relay closes switch CR121 while opening switch CR122 in the full-voltage line L14 of the transformer 75, thereby reducing the field voltage to the value selected with the transformer. Accordingly, rapid expansion continues with reduced strength and under the control of the lamp bulb.

The loading arm 53 (FIG. 2) leaves switch LS19 to close this switch in line L17, and continues to turn with the shaft 54 until it engages the stop 59 and begins to slip, thereby creating the drag for reducing the motor speed as the stones 13 approach the bore wall 11. Upon engagement, the motor 30' stalls, the current begins to rise, and the current increase raises the filament temperature and resistance to increase the voltage drop across the bulb 51 and correspondingly reduce the terminal voltage, thereby controlling the motor torque and signalling electrically that the stones have engaged the wall.

Once more, a portion of the increased bulb voltage is applied to the coil of relay CR30 through the slider 70 to actuate the relay as soon as the motor stalls. Relay CR30, in turn, closes its switch CR301 in line L3 to energize relay CR43 which closes its switch CR433 for a holding circuit around switch CR301, and also closes a switch CR434 in line L11 to shift to slower feed/higher torque operation.

In this instance, the shift is accomplished by increasing the effective strength of the motor 30'. For this purpose switch CR434 activates a special force control device 77 including a variable speed, continuously running timing motor 78 driving a rotary cam 79 for opening and closing a switch 80 operable when closed to complete a circuit through line L11 and a resistor 81 therein, in parallel with the lamp bulb line L22. A representative value of the resistor is 500 ohms, and this value may be made adjustable for a range of resistance selection. The timing motor is operated at a preselected rate which, coupled with the shape of the cam 79, holds the switch 80 closed for a predetermined period of time during each revolution of the cam.

The effect of introducing the resistor 81 in parallel with the lamp bulb 51 is to partially short-circuit the bulb for selected periodic intervals and thereby increase the motor's strength for timed pulses of torque providing the force required during the honing operation. By varying the timing of the pulses, or adjusting the value of the resistor 81, the force range during honing may be adjusted for different anticipated honing conditions.

Termination of the cycle again is initiated by closure of the sizing switch LS17 and energization of relay CR14 which deenergizes relays CR43 and CR12 and the timer T17. Switch CR434 opens to deactivate the force control device 77, switch TD174 closes to restore the by-pass circuit around the lamp bulb 51, and switch CR123 closes in line L17 to complete the circuit to relay CR13 through switch LS19, line L19, switch CR361 (during "up" stroke), and switch LS16. Relay CR13 closes its switches CR134 and CR135 to reverse the flow of current through the armature 72 and thereby run the motor 30' reversely, at high speed, until switch LS19 is opened by the loading arm 53 to terminate collapsing of the tool 12.

From the foregoing descriptions of the components and operation of the expansion mechanism and the two alternate controls, it will be seen that the present invention eliminates the need for mechanical slipping or torque sensing devices for switching from the traverse rate to the slow-feed rate, and instead accomplishes the changeover in response to electrical sensing of the stalling of the traverse actuator. This provides positive control of the maximum torque, and eliminates the danger of mechanical lock-up.

The operation of the machine in this manner is made possible first by using a relatively weak electric actuator for a first high speed, low torque range of operation, and second (by controlling its maximum torque with the lamp bulb filament 45 in series with the armature of the traverse motor to reduce the terminal voltage as the current increases, thereby reducing the maximum current drawn by the armature in the stalled condition. Moreover, the filament not only modulates the torque but also senses the stalling of the motor and produces the voltage signal for initiating the changeover for the lower speed, higher torque range used during the honing operation, whether by changing to a second actuator such as the second electric motor and its reduction gearing or by changing the operating characteristics of the first actuator.

I claim as my invention:

1. In an automatic honing machine having a reciprocating and rotating tool with at least one honing element thereon movable radially outwardly from a collapsed condition to an expanded condition, expansion mechanism for feeding said element from said collapsed condition into engagement with and progressively into the wall of a bore in a workpiece to hone the wall, a first electric motor for driving said expansion mechanism at a relatively high speed and low torque, said first motor having an armature drawing current at a variable rate increasing in relation to resistance to feeding of said element, a second electric motor for driving said expansion mechanism at a lower speed and with higher torque, and means for selectively activating said motors first for said high-speed feeding and then for said lower-speed feeding, the improvement comprising, a resistor having a high positive temperature coefficient connected in series with said armature whereby the resistance value of said resistor increases with the current drawn by the armature upon engagement of said element with said wall and produces a voltage drop in the armature circuit to modulate the motor torque in accordance with current increases, a loading device activated after initiation of said high-speed feeding when said element is a preselected distance from said wall to apply an increased load to said expansion mechanism thereby decelerating said first motor before said element engages said wall, and means actuated upon attainment of a preselected voltage drop across the resistor during operation of said first major indicating stalling of the latter and operable to deactivate the first motor and activate said second motor for slower, high torque feeding of said element.

2. The combination defined in claim 1 in which said resistor is a lamp bulb filament.

3. The combination defined in claim 1 in which said loading device comprises a member movable along a predetermined path by said expansion mechanism, a stop positioned along said path to engage said member, and means coupling said member to said expansion mechanism with a slip friction connection whereby the member slips and exerts a frictional drag on said expansion mechanism after engagement with said stop.

4. In an automatic honing machine having a reciprocating and rotating tool with at least one honing element thereon movable radially outwardly from a collapsed condition to an expanded condition, expansion mechanism for feeding said element from said collapsed condition into engagement with and progressively into the wall of a bore in a workpiece to hone the wall, and a two-range electric power actuator for driving said expansion mechanism in a first high speed, low torque range and a second lower speed, higher torque range, said actuator having a member drawing current at a variable rate increasing in relation to the resistance to feeding of said element, the improvement comprising, means for energizing said actuator in said first range with said element in collapsed condition to feed said element toward said expanded condition at high speed, means sensing the current drawn by said actuator in said first range, signaling the extent of increases in the current, and controlling the current increase to modulate the torque exerted by said actuator when stalled, and means operable in response to a predetermined current signal indicating stalling of said actuator to shift the latter from said first range to said second range thereby to initiate slow feeding of said element in response to engagement of the latter with the bore wall.

5. The combination defined in claim 4 in which said actuator includes a motor having an armature and in which said sensing and modulating means comprises a resistor having a high positive temperature coefficient and connected in series with said armature whereby the resistance value of the resistor increases with the current drawn by the armature.

6. The combination defined in claim 5 in which said resistor is the tungsten filament of an incandescent lamp bulb.

7. The combination defined in claim 5 in which said two-range actuator comprises a first relatively weak motor having a relatively high no-load speed and a second motor for operating at lower speed and in a higher torque range, and further including means for coupling said first motor to said expansion mechanism to feed said element rapidly into engagement with said workpiece and operable in response to said predetermined current signal to deactivate said first motor and activate said second motor to initiate said slow feeding.

8. The combination defined in claim 5 in which said two-range actuator comprises a single motor controlled during high-speed feeding of said element to exert a maximum stalled torque below a preselected level, and means actuated by said current signal and operable to increase the effective torque of said motor above said preselected level.

9. The combination defined in claim 8 in which the torque-increasing means comprises a device for by-passing said resistor for timed periodic intervals and creating higher torque pulses during said intervals.

10. In an automatic honing machine having a reciprocating and rotating tool with at least one honing element thereon movable radially outwardly from a collapsed condition to an expanded condition, expansion mechanism for feeding said element from said collapsed condition into engagement with and progressively into the wall of a bore in a workpiece to hone the wall, an electric motor for driving said expansion mechanism and having an armature drawing electric current at a variable rate increasing in relation to resistance to feeding of said element, the impovement comprising, a resistor having a high positive temperature coefficient and connected in series with said armature whereby the resistance value of said resistor increases with the current drawn by the armature and produces a voltage drop in the armature circuit to modulate motor torque in accordance with current increases, selectively actuatable means for increasing the effective strength of said motor from a first high-speed and low-torque range to a second lower speed and higher torque range, and means operable in response to the attainment of a preselected voltage drop across said resistor during operation of said motor in said first range to actuate said strength-increasing means and shift the motor into said second range.

11. In a machine tool having a tool element for engaging a workpiece, mechanism for feeding said tool element into said workpiece, and a two-range power actuator for driving said feeding mechanism to feed said element in a first high speed, low torque range and then in a second lower speed, higher torque range, said actuator including an electric motor having a member drawing current at a variable rate increasing in relation to the resistance to feeding of said element during feeding of the element in said first range, the improvement comprising, means for energizing said actuator in said first range to advance the element at high speed toward and into engagement with the workpiece, means sensing the current drawn by said actuator in said first range, signaling the increase in current when said element engages the workpiece, and controlling the current increase to modulate the torque of said actuator in stalled condition thereby to avoid excessive pressure on said element, and means operable in response to a predetermined current signal indicating full engagement of the tool with the workpiece to shift said actuator to said second range and increase the torque exerted by the actuator thereby to feed the tool element relatively slowly into the workpiece.

12. The combination defined in claim 11 in which said motor has an armature and in which said sensing and modulating means comprises a resistor having a high positive temperature coefficient and connected in series with said armature whereby the resistance value of said resistor increases with the current drawn by the armature and produces a voltage drop in the armature circuit to modulate the torque of the actuator, the increased voltage drop constituting said current signal.

13. The combination defined in claim 11 further including means acting on said feeding mechanism to exert a yieldable resistance to feeding of said element as the latter approaches a preselected position thereby to initiate slowing down of the speed of feed when the element is close to the workpiece.

14. The combination defined in claim 13 in which the last-mentioned means comprises a loading device actuated when said element is spaced a preselected distance from the workpiece and operable to exert a continuing drag on said feeding mechanism until the element engages the workpiece.

References Cited
UNITED STATES PATENTS

| | | | |
|---|---|---|---|
| 2,781,616 | 2/1957 | Estabrook | 51—34 X |
| 2,795,089 | 6/1957 | Seborg | 51—346 |
| 2,819,566 | 1/1958 | Johnson | 51—165 X |
| 3,237,350 | 3/1966 | Estabrook | 51—290 |

LESTER M. SWINGLE, Primary Examiner

U.S. Cl. X.R.

51—34